United States Patent [19]

Molloy et al.

[11] Patent Number: 4,540,381
[45] Date of Patent: Sep. 10, 1985

[54] SELECTIVELY OPERABLE ROTARY DRIVE MEANS

[75] Inventors: Edward W. Molloy, Port Clinton; Ronald E. Shafer, Milan, both of Ohio

[73] Assignee: General Motors Corporation, Detroit, Mich.

[21] Appl. No.: 643,689

[22] Filed: Aug. 23, 1984

[51] Int. Cl.³ .............. F16D 27/00; F16H 37/06; F16H 15/08; H02K 9/06
[52] U.S. Cl. .................... 464/29; 74/198; 74/751; 74/798; 192/84 T; 310/62
[58] Field of Search ........... 464/1, 2, 29, 30, 35, 464/36; 192/84 T; 74/198, 798, 751; 310/62, 63, 203, 90

[56] References Cited

U.S. PATENT DOCUMENTS

| 2,820,440 | 1/1958 | Jacobs | 123/41.11 |
| 3,727,473 | 4/1973 | Bayer | 74/198 |
| 3,865,222 | 2/1975 | Briar | 464/29 X |
| 4,033,438 | 7/1977 | Wiltsey | 464/29 X |
| 4,258,589 | 3/1981 | Mitchell | 74/796 |
| 4,437,846 | 3/1984 | Ragaly | 464/36 |
| 4,446,391 | 5/1984 | Sekine et al. | 310/62 |

FOREIGN PATENT DOCUMENTS

| 141743 | 11/1981 | Japan | 310/62 |
| 523926 | 7/1940 | United Kingdom | 310/62 |

Primary Examiner—Stuart S. Levy
Assistant Examiner—Thomas R. Hannon
Attorney, Agent, or Firm—Patrick M. Griffin

[57] ABSTRACT

An alternator cooling fan drive includes a radial bearing, the outer race of which mounts the fan within the magnetic field produced by the alternator under load. The bearing has pathways with a curvature close enough to the balls that the races will self-center and transmit a minimum torque to the fan when the magnetic field is weak. The pathway and ball configurations are sufficiently divergent that when the magnetic field pulls in on the fan, the races can misalign and wedge the balls more tightly between the races to transmit more torque to the fan. The fan drive is thus more directly responsive to the need for cooling.

3 Claims, 3 Drawing Figures

SELECTIVELY OPERABLE ROTARY DRIVE MEANS

This application relates to selectively operable rotary drive means and specifically to a selectively operable fan drive for a vehicle alternator cooling fan.

BACKGROUND OF THE INVENTION

It is often desirable, in a vehicle, that certain rotary devices, for example the radiator cooling fan, be driven at speeds different than engine speed. Driving a cooling fan in a one to one relationship with the engine drive shaft or with a shaft driven by the engine may yield a fan speed that is too high, and wasteful of energy, at higher engine speeds. Many variable speed fan drives are known and used in conjunction with radiator cooling fans. These provide fan slippage at high engine speeds, and are also selectively operable dependent upon radiator temperature. Such devices may be somewhat voluminous and complex, but are warranted by the large amount of energy to be saved.

Typically, the cooling fan for a vehicle alternator is rigidly mounted to, and turns one to one with, the alternator shaft. Being a much smaller fan, both cost and space considerations prevent the use of fan drives such as those found in radiators. However, it would also be desirable to drive an alternator cooling fan in a selectively operable fashion, if it could be done simply and economically. Energy could be saved, and the fan would not have to withstand the stresses caused at higher engine speeds by a rigid mounting. Additionally, the need for cooling in a typical vehicle alternator is not related to engine speed alone. The need for cooling in a vehicle alternator is most directly related to the load thereon, the current that it is called upon to produce. Therefore, it would be desirable to have a fan drive that was selectively operable, i.e. directly responsive to that need for cooling, as opposed to merely providing fan slippage at high shaft speeds.

The U.S. Pat. No. 4,437,846 to Ragaly discloses an alternator fan drive including a pair of axially side by side bearings interposed between the hub of the cooling fan and the generator shaft. The inner races of the bearings are rigid to the generator shaft. The outer races of the bearings are fitted within the hub of the fan, one rigidly fitted and one axially slidable therewithin. A spring biases these outer races apart and into the bearing balls, providing a preload. The cooling fan will turn one to one with the generator shaft at low shaft speeds, because the preload is not overcome. At higher shaft speeds, the preloaded bearings and the fan will slip relative to the shaft. While there is an energy savings over a rigid mounting, the drive means is responsive only to varying shaft speed. In addition, the structure is somewhat complex, requiring two bearings and a spring, as well as a consequent lengthening of the fan hub to include the bearings. A matching offset portion must also be added to the drive pulley to accommodate the fan hub and bearings.

SUMMARY OF THE INVENTION

The selectively operable rotary drive means of the invention is a fan drive that drives the cooling fan of a vehicle alternator in a way more directly related to the need for cooling thereof. In addition, it may be used in conjunction with another drive means that is directly responsive to shaft speed. The structure is extremely simple and requires very little modification of a conventional alternator cooling fan.

The fan drive of the invention includes a radial ball bearing with an outer race rigidly joined to the hub of the alternator cooling fan, a concentric inner race rigidly mounted to the alternator shaft and a complement of bearing balls disposed between the ball pathways of the races. The outer race mounts the cooling fan to the shaft within the lines of a magnetic field produced by the alternator when it is under load. The fan is at least partially made of ferrous metal. Therefore, the magnetic field will pull on the fan and can be used to drive the fan drive in response to the need for cooling.

When the alternator shaft is being driven by the vehicle engine, but the alternator is not under load, the magnetic field will be weak and the fan will not be significantly affected. The ball pathways of the inner and outer races are designed with a radius of curvature larger than that of the bearing balls. However, the balls and pathways have a relative configuration that is sufficiently conforming where the balls and pathways are engaged that the races will axially align with each other to a low cooling, minimum friction position as the ball pathways self-center on the bearing balls. This is done by making the radius of curvature of the inner race sufficiently close to the radius of the bearing balls. There will be little turning force transmitted between the bearing balls and the pathways, and the cooling fan will slip relative to the turning shaft.

When the alternator is producing significant current, the cooling fan will be pulled toward the main body of the alternator by the stronger magnetic field. The relative configuration of the bearing balls and the pathways is sufficiently divergent that the outer race, rigidly joined to the cooling fan, will be shifted axially inwardly slightly relative to the inner race to a high cooling position. This is done by making the radius of curvature of the outer race sufficiently larger than the radius of the bearing balls. This axial misalignment wedges the bearing balls more tightly between the ball pathways and transmits more turning force to the outer race mounted cooling fan. Thus, the cooling fan will be driven fastest when the most waste heat is generated, simultaneously with and in response to the increased strength in the magnetic field.

The fan drive of the invention uses a minimal number of parts, and takes advantage of a magnetic field that is already present. In addition, the invention may be used in conjunction with, and to enhance the operation of, a shaft speed responsive fan drive that also uses the same radial bearing.

It is, therefore, an object of the invention to provide a selectively operable drive means for the cooling fan of a power source that is responsive to a magnetic field that is produced as the power source operates and produces greater waste heat, incuding a rolling element bearing mounting the fan within the magnetic field and having a relative configuration where the rolling elements engage the pathways of the bearing races that is sufficiently conforming that the races will axially align to a low cooling position when the field is relatively weaker, but sufficiently divergent that the races will axially misalign to a high cooling position when the field is relatively stronger.

It is another object of the invention to provide such a drive means that includes a radial ball bearing mounting the fan to a rotary shaft within the magnetic field, with the ball pathways of at least one of the races having a radius of curvature sufficiently close to the radius of the bearing balls that the races may align axially to a low cooling position to let the cooling fan slip when the magnetic field is weak, while the radius of curvature of at least one of the ball pathways is sufficiently larger than the radius of the bearing balls that the fan will be pulled inwardly, axially misaligning the races to a low cooling position to wedge the balls between the pathways and to transmit more turning force to the fan when the magnetic field is stronger and more cooling is needed.

It is yet another object of the invention to provide a selectively operable drive means as described which may be used in conjunction with and in cooperation with a shaft speed responsive drive means utilizing the same bearing.

It is a still further object of the invention to provide such a selectively operable drive means that uses a minimal number of parts and that may be used in a typical vehicle alternator with little alteration to the existing components thereof.

BRIEF DESCRIPTION OF THE DRAWINGS

These and other objects and features of the invention will appear from the following written description and drawings in which.

DESCRIPTION OF THE PREFERRED EMBODIMENT

Figure 1:
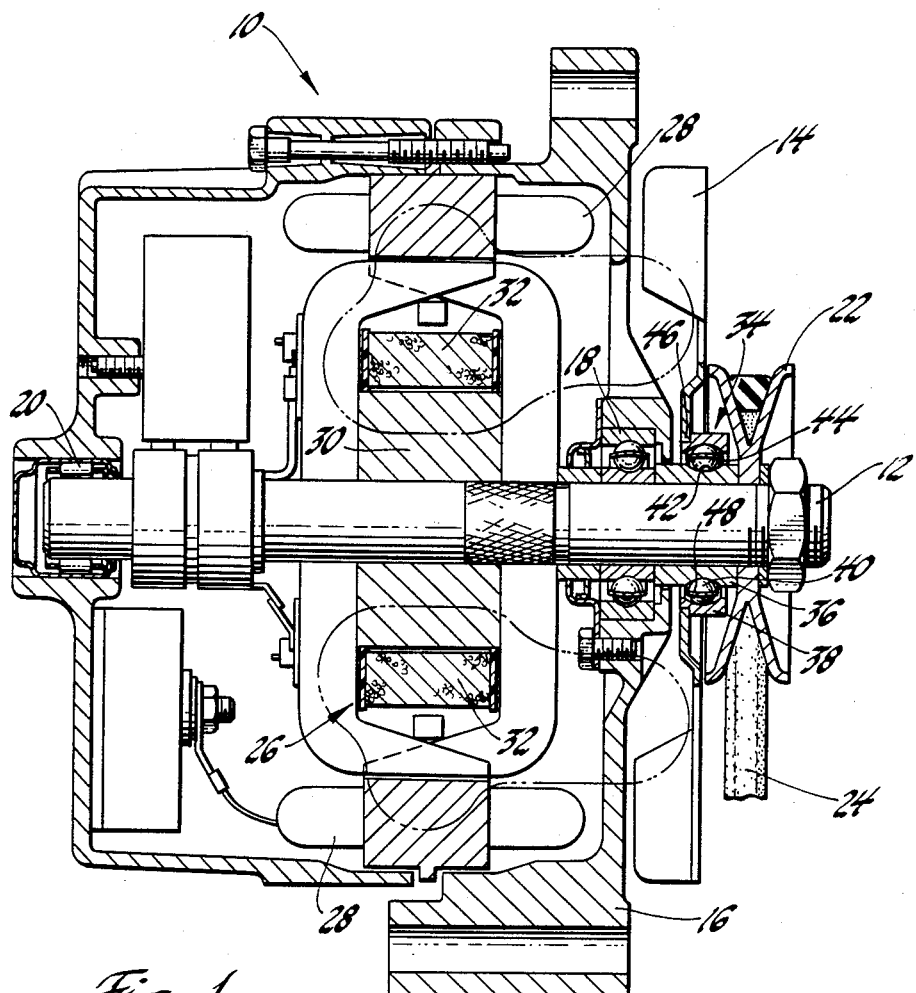
FIG. 1 is a cross sectional view of the vehicle alternator including the drive means of the invention.

Referring first to FIG. 1, a power source, in this case a vehicle alternator 10, includes a rotary axial shaft 12 and a cooling fan 14. Shaft 12 is supported for rotation within alternator housing 16 by support bearings 18 and 20. Shaft 12 is driven by pulley 22, which is in turn driven by a belt 24 from the vehicle engine. Conventionally, cooling fan 14 would be mounted rigidly to and would turn one to one with shaft 12. In that case, fan 14 would provide more cooling air to alternator 10 as shaft 12 was driven faster by the vehicle engine. However, the volume of air moved by fan 14, and the energy expended thereby, would increase roughly as the cube of the speed of shaft 12. This is a greater volume of air than is necessary for cooling at the higher speeds, and is consequently wasteful of energy, as well as causing higher noise levels. A fan drive that allows fan 14 to slip at higher shaft speeds, thereby saving energy, is disclosed in application Ser. No. 611,135, also assigned to the assignee of the present invention.

However, with a vehicle alternator, the need for cooling is most directly a function of the load upon, the current being produced by, the alternator. Still referring to FIG. 1, current is produced when the shaft 12 turns the rotor assembly, designated generally at 26, relative to the stator 28. Rotor assembly 26 consists of an inner iron core 30 surrounded by field windings 32. When there is an increased demand for current, a voltage regulator, not shown, increases the field current in the field windings 32. During this increased generation of current, more waste heat is produced and there is a consequent greater need for cooling. Coincidentally, a greater magnetic field is produced between core 30 and stator 28, the farthest reaching flux lines of which are shown in dotted lines in FIG. 1. While this magnetic field is weakest at its fringes, it is still significant and does vary in strength as described.

Figure 2:
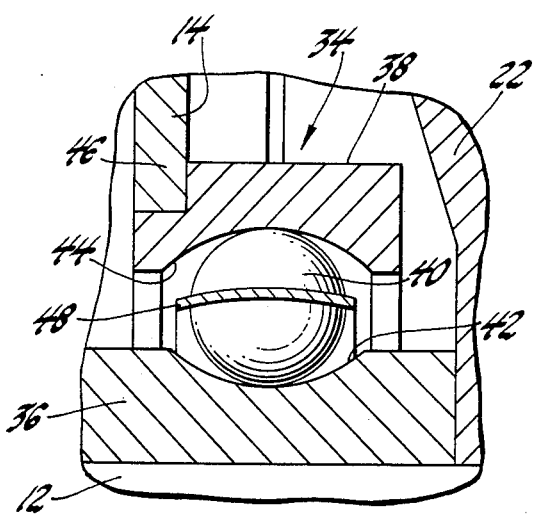
FIG. 2 is an enlargement of a portion of FIG. 1 showing the drive means in a low cooling position.
Figure 3:
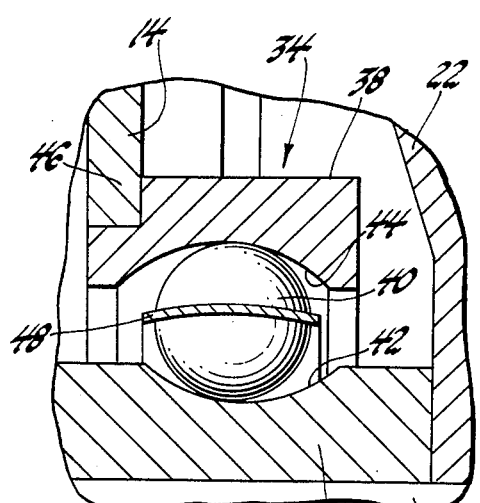
FIG. 3 is a view similar to FIG. 2, but showing the drive means in a high cooling position.

The selectively operable drive means of the invention is a fan drive including a radial ball bearing, designated generally at 34 and best seen in FIGS. 2 and 3. Bearing 34 includes inner and outer concentric races, 36 and 38 respectively. A complement of bearing balls 40 is received between the ball pathways 42 and 44 of races 36 and 38 respectively. As seen in FIG. 1, inner race 36 is elongated so as to be clamped between pulley 22 and support bearing 18, and is thus rigid to shaft 12. Outer race 38 is press fit or otherwise rigidly mounted to the central hub 46 of fan 14. Outer race 38 thus locates fan 14 within the magnetic field. Fan 14 is formed of ferrous metal, generally a steel stamping. Therefore, fan 14 may be pulled axially inwardly by the magnetic field toward housing 16, along with the outer race 38.

It is generally true in a radial, angular contact bearing that the radius of curvature of the ball pathways is larger than that of the balls. Were the radii the same or very close, the bearing would run with far too much friction. The measure of the relationship of these radii is often expressed in terms of a dimensionless coefficient called the curvature. The curvature is defined as the ratio of the raceway radius of curvature to the ball diameter, expressed as a percentage. One extreme which may be imagined would be exact conformance, or a curvature of 50%. The opposite extreme would be straight pathways with no curvature. The curvature employed in the invention is between these two extremes, and discussed further below. The curvature magnitude of a radial bearing is generally larger than 50%, typically in the range of 55–60%, and need not be the same for each pathway.

What is necessary to the operation of the invention is that races 36 and 38 be able to move between a first, reduced friction position to a second, higher friction position under the influence of the magnetic field. The first position is seen in FIG. 2 and may be termed a relatively low cooling position. There must be a sufficiently close conformance in the relative configuration of the engaged bearing balls 40 and pathways 42 and 44 that the races 36 and 38 will axially align as the pathways 42 and 44 seek to center on the bearing balls 40 when fan 14 is not being significantly acted upon by the relatively weak field. It is then that the need for cooling is smallest. This conformance is achieved by making the radius of curvature of pathway 42 sufficiently close to the radius of bearing balls 40, described further below. While fan 14 will still be driven by shaft 12 in that first position, the turning force or torque transmitted from inner race 36, through balls 40, to outer race 38 and ultimately to fan 14 will be at a minimum. The slippage of fan 14 relative to the shaft 12 will be consequently at a maximum.

The second position is seen in FIG. 3 and may be termed a relatively high cooling position. There must be a sufficient divergence in the relative configuration of the engaged bearing balls 40 and pathways 42 and 44 that the races 36 and 38 will axially misalign as a relatively stronger magnetic field pulls fan 14 toward housing 16. It is then that the need for cooling is highest. This divergence is achieved by making the radius of curvature of pathway 44 sufficiently larger than the radius of ball 40, discussed further below. In this high cooling position, the bearing balls 40 will be wedged more tightly between pathways 42 and 44, creating a greater frictional engagement therebetween. Thus, more turning force will be transmitted from shaft 12 through inner race 36, through bearing balls 40 and ultimately to outer race 38 and fan 14. This will decrease the slippage and give greater fan speed and cooling capacity at just the time it is specifically needed, that is, when alternator 10 is under load and producing the greatest waste heat. The FIG. 2 low cooling position will again occur when the magnetic field weakens and there is less need for cooling.

In the embodiment disclosed, the complement of bearing balls 40 numbers 10, with a 3/16th inch ball diameter, and a ball circle diameter of 1.024 inches. A standard separator 48 keeps balls 40 circumferentially spaced. Pathway 44 of outer race 38 has a radius of curvature of 0.140 inches, or a curvature of 75%. The radius of pathway 42 of inner race 36 is 0.0994 inches, a curvature of 53%. The radii difference and the axial misalignment in FIGS. 2 and 3 is exaggerated for purposes of illustration. It is to be understood that bearing 34 need not necessarily be a ball bearing as shown. A barrel bearing could work similarly, as long as the necessary relationship of radii between the pathways and the rolling elements held.

As is clear from FIG. 1, very little modification is necessary to accommodate the drive means of the invention. Only a central hub 46 in fan 14 is necessary to accommodate bearing 34, the elongated inner race 36 of which replaces a spacing ring which would otherwise be present. Pulley 22 need not be modified at all, nor is the space between pulley 22 and support bearing 18 changed. In addition, ball bearing 34 may be used as a speed responsive, viscous coupling by the use of a suitably chosen viscous grease interposed among the bearing balls 40. This is the subject of the application referred to above. Thus, it is possible for the same bearing 34 to be used in both applications, to give both a shaft speed response and a magnetic field response. The two will act in conjunction, and will not interfere with one another.

It will be understood, therefore, that the selectively operable drive means of the invention is capable of being embodied in other structures and is not intended to be limited to that disclosed herein.

The embodiments of the invention in which an exclusive property or privilege is claimed are defined as follows:

1. A selectively operable drive means for driving an at least partially ferrous metal cooling fan by a rotary axial shaft of a power source that has the characteristic of producing waste heat proportional to the strength of a magnetic field produced by the power source, comprising, a rolling element bearing having an outer race mounting the cooling fan within the magnetic field, whereby the magnetic field may act on the cooling fan to pull said portion and the outer race axially toward the power source, an inner race mounted to rotate with the shaft, and a complement of rolling elements disposed between pathways of the races, said rolling elements and pathways engaging one another with a relative configuration that is sufficiently conforming that the races will, when the magnetic field is relatively weak, axially align relative to one another as the pathways seek to center on the rolling elements to a relatively low cooling position with reduced friction between the rolling elements and the pathways and consequent slippage of the fan and outer race relative to the shaft when less heat is generated, said relative configuration of the rolling elements and pathways also being sufficiently divergent that the races will axially misalign to a relatively high cooling position when a relatively stronger magnetic field acts on the ferrous portion of the fan to, in turn, wedge the rolling elements more tightly between the pathways to transmit more turning force from the inner race, through the rolling elements, and to the outer race and cooling fan to give consequently less slippage, and consequently greater fan speed and cooling, when more waste heat is generated.

2. A selectively operable drive means for driving an at least partially ferrous metal cooling fan by a rotary axial shaft of a power source that has the characteristic of producing waste heat proportional to the strength of a magnetic field produced by the power source, comprising, a rolling element bearing having an outer race mounting the cooling fan within the magnetic field, whereby the magnetic field may act on the cooling fan to pull said portion and the outer race axially toward the power source, an inner race mounted to rotate with the shaft, and a complement of curved rolling elements disposed between curved pathways of the races, said rolling elements having a radius of curvature smaller than the radius of curvature of the pathways with at least one of said pathways having a radius of curvature sufficiently close to the radius of curvature of the rolling elements that the races will, when the magnetic field is relatively weak, axially align relative to one another as the pathways seek to center on the rolling elements to a relatively low cooling position with reduced friction between the rolling elements and the pathways and consequent slippage of the fan and outer race relative to the shaft when less heat is generated, at least one of said pathways having a radius of curvature sufficiently larger than the radius of curvature of the rolling elements that the races will axially misalign to a relatively high cooling position when a relatively stronger magnetic field acts on the ferrous portion of the fan to, in turn, wedge the rolling elements more tightly between the pathways to transmit more turning force from the inner race, through the rolling elements, and to the outer race and cooling fan to give consequently less slippage, and consequently greater fan speed and cooling, when more waste heat is generated.

3. A selectively operable drive means for driving at least partially ferrous metal cooling fan by a rotary axial shaft of a power source that has the characteristic of producing waste heat proportional to the strength of a magnetic field produced by the power source, comprising, a radial ball bearing having an outer race mounting the cooling fan within the magnetic field, whereby the magnetic field may act on the cooling fan to pull said portion and the outer race axially toward the power source, an inner race mounted to rotate with the shaft, and a complement of bearing balls disposed between curved pathways of the races, said bearing balls having a radius smaller than the radius of curvature of the pathways with at least one of said pathways having a radius of curvature sufficiently close to the radius of the bearing balls that the races will, when the magnetic field is relatively weak, axially align relative to one another as the pathways seek to center on the bearing balls to a relatively low cooling position with reduced friction between the bearing balls and the pathways and consequent slippage of the fan and outer race relative to the shaft when less heat is generated, at least one of said pathways having a radius of curvature sufficiently larger than the radius of the bearing balls that the races will axially misalign to a relatively high cooling position when a relatively stronger magnetic field acts on the ferrous portion of the fan to, in turn, wedge the bearing balls more tightly between the pathways to transmit more turning force from the inner race, through the bearing balls, and to the outer race and cooling fan to give consequently less slippage, and consequently greater fan speed and cooling, when more waste heat is generated.

* * * * *